US011715497B2

(12) United States Patent
Zhu et al.

(10) Patent No.: US 11,715,497 B2
(45) Date of Patent: Aug. 1, 2023

(54) VIDEO EDITING METHOD, APPARATUS, AND DEVICE, AND STORAGE MEDIUM

(71) Applicant: TENCENT TECHNOLOGY (SHENZHEN) COMPANY LIMITED, Guangdong (CN)

(72) Inventors: Xiao Long Zhu, Shenzhen (CN); Shenghui Huang, Shenzhen (CN); Lijian Mei, Shenzhen (CN); Wei Dong Chen, Shenzhen (CN); Shao Bin Lin, Shenzhen (CN); Yi Tong Wang, Shenzhen (CN); Xing Ji, Shenzhen (CN); Jie Fan, Shenzhen (CN); Min Luo, Shenzhen (CN); Wanyu Huang, Shenzhen (CN); Yuan Fang, Shenzhen (CN); Ren Jian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 235 days.

(21) Appl. No.: 17/314,231

(22) Filed: May 7, 2021

(65) Prior Publication Data

US 2021/0264952 A1 Aug. 26, 2021

Related U.S. Application Data

(63) Continuation of application No. PCT/CN2020/078548, filed on Mar. 10, 2020.

(30) Foreign Application Priority Data

Mar. 21, 2019 (CN) .......................... 201910217779.5

(51) Int. Cl.
*G11B 27/34* (2006.01)
*G06N 20/00* (2019.01)
(Continued)

(52) U.S. Cl.
CPC .............. *G11B 27/34* (2013.01); *G06N 20/00* (2019.01); *G06V 20/46* (2022.01); *G11B 27/034* (2013.01); *G11B 27/36* (2013.01); *H04N 5/262* (2013.01)

(58) Field of Classification Search
CPC ....... G11B 27/34; G11B 27/034; G11B 27/36; G06N 20/00; G06V 20/46; H04N 5/262
See application file for complete search history.

(56) References Cited

U.S. PATENT DOCUMENTS

| 8,015,493 B2 * | 9/2011 | Tsuchiya .............. | G11B 27/329 386/281 |
| 2003/0001948 A1 * | 1/2003 | Mochizuki ..... | H04N 21/234318 348/E7.071 |

(Continued)

FOREIGN PATENT DOCUMENTS

| CN | 106899809 A | 6/2017 |
| CN | 107770626 A | 3/2018 |
| CN | 109819179 A | 5/2019 |

OTHER PUBLICATIONS

Translation of the Written Opinion of the International Searching Authority dated May 28, 2020 in International Application No. PCT/CN2020/078548.

(Continued)

*Primary Examiner* — Mishawn N. Hunter
(74) *Attorney, Agent, or Firm* — Sughrue Mion, PLLC

(57) ABSTRACT

A video editing method, apparatus and storage medium are provided. The method includes obtaining an object, the object including one or more images; determining a content element of the object for video editing, the content element having a content type identifier; determining a material set identifier corresponding to the content type identifier according to a first behavior tree logic; determining a video editing material set corresponding to the material set identifier; and (Continued)

obtaining an edited video according to the content element and the video editing material set.

17 Claims, 9 Drawing Sheets

(51) Int. Cl.
  *G11B 27/034* (2006.01)
  *G11B 27/36* (2006.01)
  *H04N 5/262* (2006.01)
  *G06V 20/40* (2022.01)

(56) References Cited

U.S. PATENT DOCUMENTS

2007/0248313 A1* 10/2007 Kageyama ........... G11B 27/034
  386/281
2012/0195573 A1    8/2012 Flint et al.

OTHER PUBLICATIONS

International Search Report of PCT/CN2020/078548 dated May 28, 2020 [PCT/ISA/210].
Written Opinion of PCT/CN2020/078548 dated May 28, 2020 [PCT/ISA/237].

* cited by examiner

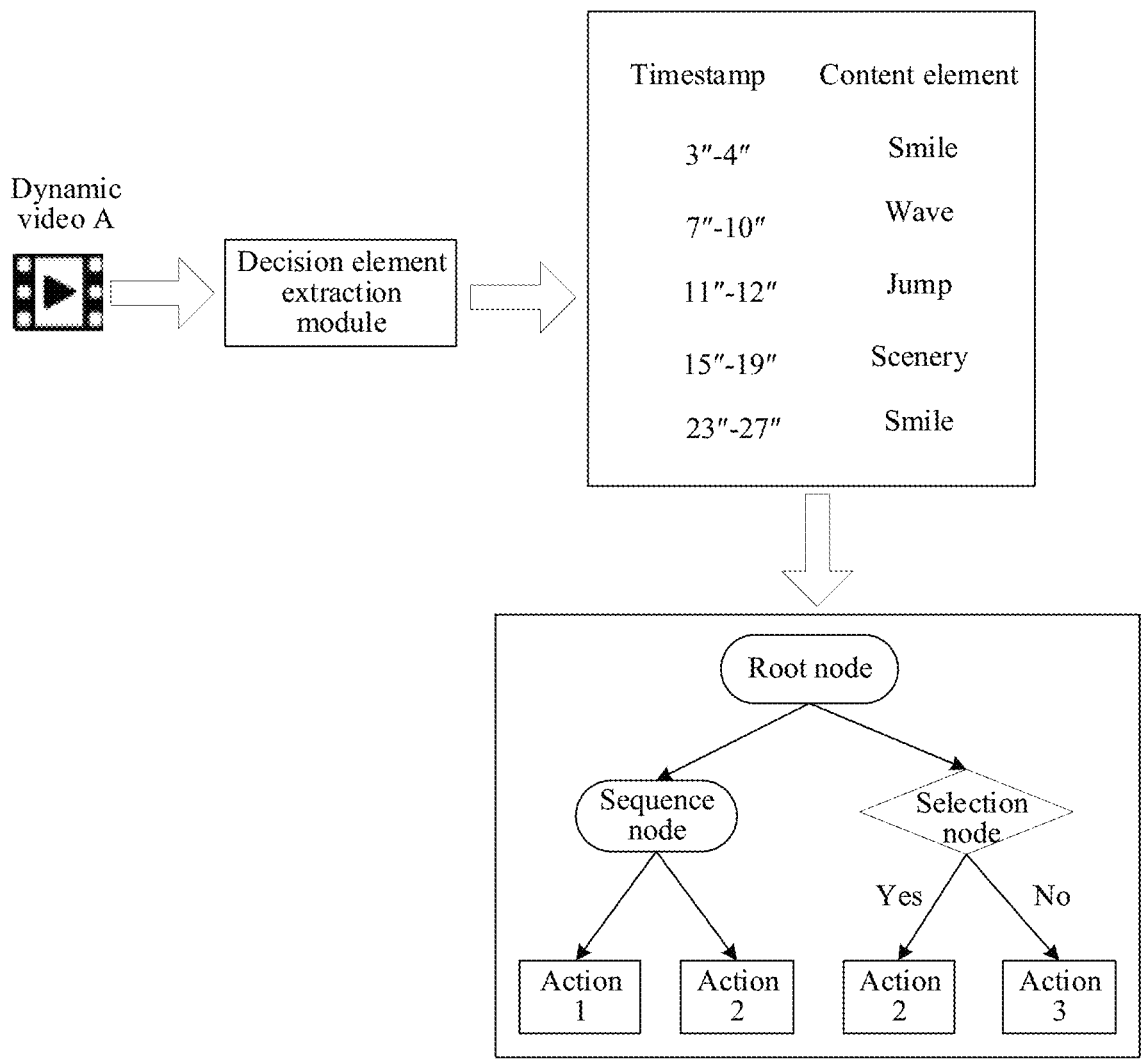

FIG. 4

| | |
|---|---|
| The terminal device determines, in a case that there are a plurality of material set identifiers, a target material set identifier from the plurality of material set identifiers | S501 |
| The terminal device uses a video editing material set corresponding to the target material set identifier as the video editing material set corresponding to the content type identifier | S502 |

FIG. 5

VIDEO EDITING METHOD, APPARATUS, AND DEVICE, AND STORAGE MEDIUM

CROSS-REFERENCE TO RELATED APPLICATION(S)

This application is a by-pass continuation application of PCT/CN2020/078548, entitled "VIDEO EDITING METHOD, APPARATUS, AND DEVICE, AND STORAGE MEDIUM" filed Mar. 10, 2020, which claims priority to Chinese Patent Application No. 201910217779.5, entitled "VIDEO EDITING METHOD AND APPARATUS" and filed on Mar. 21, 2019, the disclosures of which are incorporated by reference herein in their entirety.

FIELD

One or more embodiments relate to the field of data processing, and in particular, to a video editing method, apparatus, and device, and a storage medium.

BACKGROUND

Video editing technology may include editing and synthesizing objects, for example, a static image or a dynamic video into segments of video, which is generally used in short video production, video highlights, and other video editing scenarios.

A conventional video editing adopts a fixed editing template, and a user may select an editing template suitable for an object to automatically synthesize a video.

However, the editing template has fixed materials, for example, limited sets of music, special effects, and the like. In order to improve the quality of video editing and diversify video editing experience, editing templates may be variously generated and determined according to contents of a video.

SUMMARY

One or more embodiments of the disclosure provide a video editing method, apparatus, and device, and a storage medium, in order to create a video that is less homogenous and improve user experience.

According to an embodiment, there is provided a video editing method performed by a terminal device. The method includes: obtaining an object, the object including one or more images; determining a content element of the object for video editing, the content element having a content type identifier; determining a material set identifier corresponding to the content type identifier according to a first behavior tree logic; determining a video editing material set corresponding to the material set identifier; and obtaining an edited video according to the content element and the video editing material set.

According to an embodiment, there is provided a video editing apparatus, the apparatus including: at least one memory configured to store computer program code; and at least one processor configured to access the at least one memory and operate as instructed by the computer program code. The computer program code includes: obtaining code configured to cause at least one processor to obtain an object, the object including one or more images; first determining code configured to cause at least one processor to determine a content element of the object for video editing, the content element having a content type identifier; second determining code configured to cause at least one processor to: determine a material set identifier corresponding to the content type identifier according to a first behavior tree logic, and determine a video editing material set corresponding to the material set identifier; and synthesis code configured to cause at least one processor to obtain an edited video according to the content element and the video editing material set.

According to an embodiment, there is provided a non-transitory computer readable recording medium storing computer program code, the computer program code, when executed by at least one processor, configured to: obtain an object, the object including one or more images; determine a content element of the object for video editing, the content element having a content type identifier; determine a material set identifier corresponding to the content type identifier according to a first behavior tree logic; determine a video editing material set corresponding to the material set identifier; and obtain an edited video according to the content element and the video editing material set.

BRIEF DESCRIPTION OF THE DRAWINGS

To describe the technical solutions in the embodiments more clearly, the following briefly describes the accompanying drawings. The accompanying drawings only show some embodiments of the disclosure, and a person of ordinary skill in the art may derive other embodiments from the accompanying drawings without creative efforts.

FIG. 4 is an example diagram of determining a video editing material set corresponding to a content type identifier by using a first behavior tree logic according to an embodiment.

FIG. 5 is a flowchart for determining a video editing material set according to an embodiment.

DESCRIPTION

The following describes the one or more embodiments of the disclosure with reference to accompanying drawings.

In a conventional video editing technique, an editing template may include fixed material or editing schemes, and therefore, images or videos edited using the same editing template may result in the same or substantially the same images or videos in style and may be homogenous. Thus, the conventional video editing technique does not provide diversified video editing techniques for a user, thereby degrading the user experience.

For example, a material in an editing template may include a special effect A, and the special effect A may be applied at the 3rd second to the 4th second of a video. That is, when selecting the editing template for different images or videos, the same special effect A may be applied in the 3rd second to the 4th second, for different images or videos, and the edited images or videos obtained through synthesis using the same editing template are basically the same in the entire style.

To resolve the foregoing technical problems, one or more embodiments provide a video editing method. The method may be performed by a terminal device. The terminal device, for example, may be a device such as a smart terminal, a computer, a personal digital assistant (PDA), a tablet computer or the like that includes a video editing function.

The video editing method may be also performed by a server. The server may be a device that provides a video editing service for the terminal device. The terminal device may transmit a video and/or objects in a video to the server. The server may obtain the video and/or the objects from the terminal and perform the video editing method according to the one or more embodiments, and return the edited video to the terminal device. The server may be an independent server, or may be a server in a cluster including a plurality of servers.

The video editing method according to the one or more embodiments will be described below with reference to an actual application scenario and using a terminal device as an example.

Figure 1:
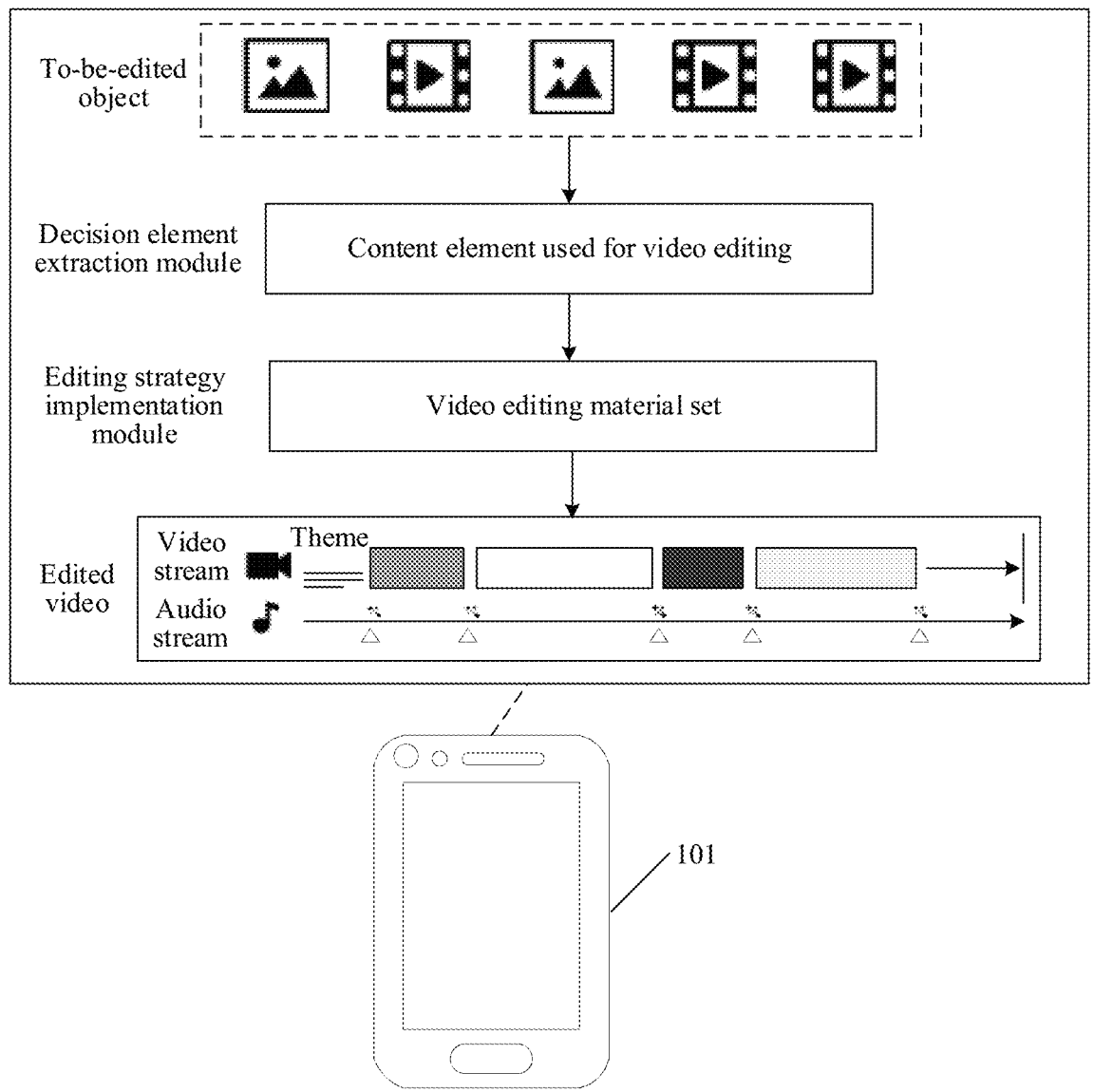
FIG. 1 is a schematic diagram for describing a video editing method according to an embodiment.

FIG. 1 is a schematic diagram of a video editing method according to an embodiment. The application scenario includes a terminal device 101, and the terminal device 101 may obtain an object to be edited. The object may be an object a static image and or a dynamic video. The object may further include a dynamic image including a plurality of static images.

The object includes a content element, and the content element may represent main content included in the object. The content element may be at least one of label information, scenario information, item information (for example, information related to humans, animals, and plants), language information, and location information of an item in the object.

For example, if the object is a dynamic video, a content element may be information extracted from the dynamic video or from a part of clip. The part of clip may be a long-shot clip, a fight clip, or the like in the dynamic video, and these video clips may be also referred to as highlights. If the object is a static image, a content element may be a human, an animal, a building, weather, or the like included in the static image.

For example, when the object is a dynamic video, and the dynamic video may include a man, a dog, and a car. A long shot may be a shot of a dog, and it may be determined that a content element is a dog. As another example, when the object is a static image, the static image may include a woman sitting on a chair with a cat in her arms, and it may be determined that a content element includes a woman, a cat, and a chair.

The terminal device 101 may determine a content element used for video editing from an object. Each content element in the object has a corresponding content type identifier, and may identify a content feature of the corresponding content element. For example, when the object is a scenery image, a content type identifier of a content element included in the object may be a scenery, and the terminal device 101 may recognize that the content element is the scenery through the content type identifier. In another example, when an object is an image or a video including a cat or a dog, content type identifiers may indicate a content element corresponding to the cat and the dog, and the terminal device 101 may recognize that the content element is a pet through the content type identifier.

To obtain a video editing element set consistent with a content feature of a content element, and to facilitate that an entire style of a synthesized edited video differs according to different content elements, after determining a content element, the terminal device 101 may determine a material set identifier corresponding to a content type identifier through a first behavior tree logic. The terminal device 101 may further determine a video editing material set corresponding to the material set identifier. The video editing material set includes various materials required for synthesizing an edited video with a content element, for example, a sticker, a filter, a special effect, a music, a caption, a title, a tail leader, and the like. The material set identifier is configured to identify a type of a video editing material in a video editing material set. For example, if a material set identifier is a pet, a video editing material included in a video editing material set corresponding to the material set identifier is related to the pet.

For example, a content type identifier of a content element may be a pet, and, a material set identifier may be determined for the pet, and a material included in a video editing material set determined according to the material set identifier is a material related to the pet. If a content type identifier of a content element is a scenery, a material set identifier may identify material related to the scenery, and a material included in a video editing material set may be determined according to the material set identifier.

A content type identifier may identify a content feature of a corresponding content element, and therefore, a video editing material set is consistent with the content feature represented by the content element. A video editing material set may applied according to content elements of different content features, and correspondingly, synthesized edited videos may have different features in style. In addition, a behavior tree logic has randomness, and therefore, diversity of a video editing material set is further improved, and edited videos synthesized according to content elements of similar content features may differ in entire styles. It may be seen that, by using the video editing method provided according to this embodiment, the edited video is less homogenous, thereby improving user experience.

Figure 2:
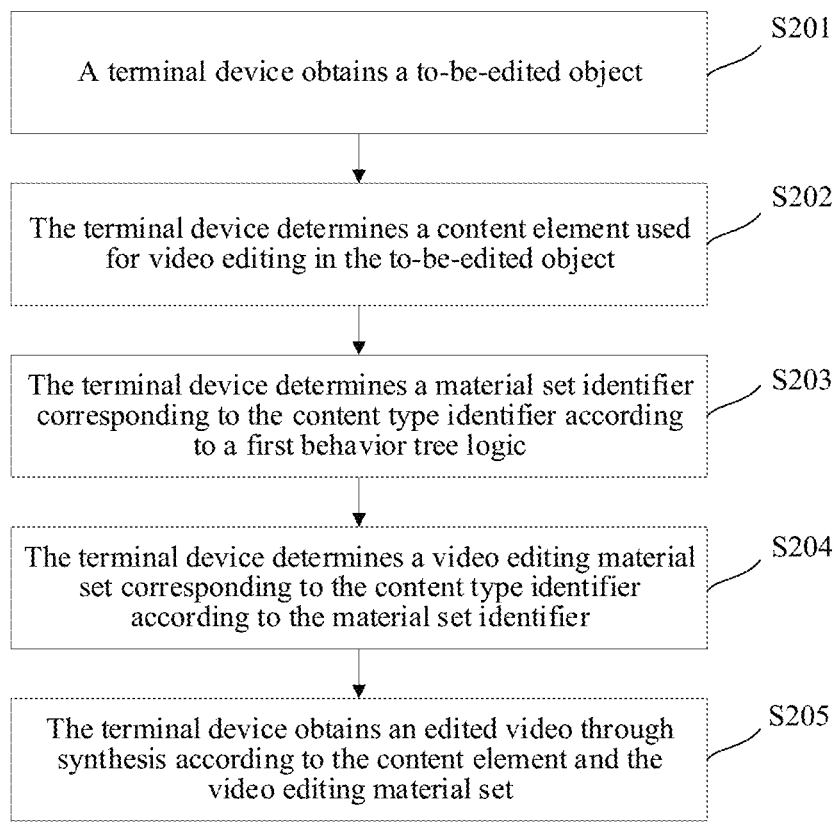
FIG. 2 is a flowchart of a video editing method according to an embodiment.

FIG. 2 is a flowchart of a video editing method according to an embodiment. The method may include the following operations.

S201. A terminal device obtains an object.

In this embodiment, object may be obtained from a static image and/or dynamic video stored in the terminal device. The stored static image and/or dynamic video may be acquired by the terminal device, or may be downloaded by the terminal device. If the stored static image and/or dynamic video is acquired by the terminal device, the static image and/or dynamic video is generally stored in an album of the terminal device. When a user needs to perform a video editing, the terminal device may prompt the user to select a static image and/or dynamic video from the album. When the user completes the selection operation, the terminal device may obtain the static image and/or dynamic video selected by the user according to the selection operation of the user. Accordingly, the terminal device uses the static image and/or dynamic video selected by the user as an object to be edited.

In addition, an object may be obtained in real time when the user needs to perform video editing by using the terminal device. That is, when the user uses a video editing function in the terminal device, the terminal device may prompt the user to acquire a static image and/or dynamic video. When the user acquires the static image and/or dynamic video by using a camera or other image capturing device in the terminal device or connected to the terminal device, the terminal device may obtain a static image and/or a dynamic video. The static image and/or dynamic video is acquired by the terminal device may be used as an object to be edited.

S202. The terminal device determines a content element in the object.

To perform automatic editing on the object, an automatic editing algorithm according to the obtained object may be used as a core of the video editing method according to this embodiment. As shown in FIG. 1, the automatic editing algorithm may mainly include two layers of architecture. A first layer of the architecture is a decision element extraction module, which is configured to perform the operation of S202 of determining a content element in an object. A second layer of the architecture is an editing strategy implementation module, which is configured to perform operations S203 and S204 of determining a material set identifier corresponding to a content type identifier and determining a video editing material set consistent with the content feature represented by the content element according to the first behavior tree logic.

It may be understood that, if an object is a dynamic video, because the dynamic video is initially non-structural data, to ensure that the terminal device may recognize a content element in the object, the object may be first converted into structural data by using artificial intelligence (AI). That is, a content type identifier is added to a target that may be used as the content element in the object by using the AI, so as to convert the object into the structural data that the terminal device may recognize.

In S202, the terminal device may determine the content element in the object and the content type identifier corresponding to the content element by extracting structural information of the object. For example, the terminal device may obtain the structural information of the object based on a timestamp, and determine the content element and the content type identifier. The structural information may include human face detection and tracking information. For example, the human face detection and tracking information may include human face key point information, human face emotion information, and human face attribution information. The structural information may also include human body detection and tracking information including, for example, gesture information and action information. The structural information may include pet detection and tracking information including, for example, pet face key point and pet type information, and audio information obtained through voice activity detection (VAD), and the like. The audio information may be obtained through a microphone or the like included or connected to the terminal device 101.

Figure 3:
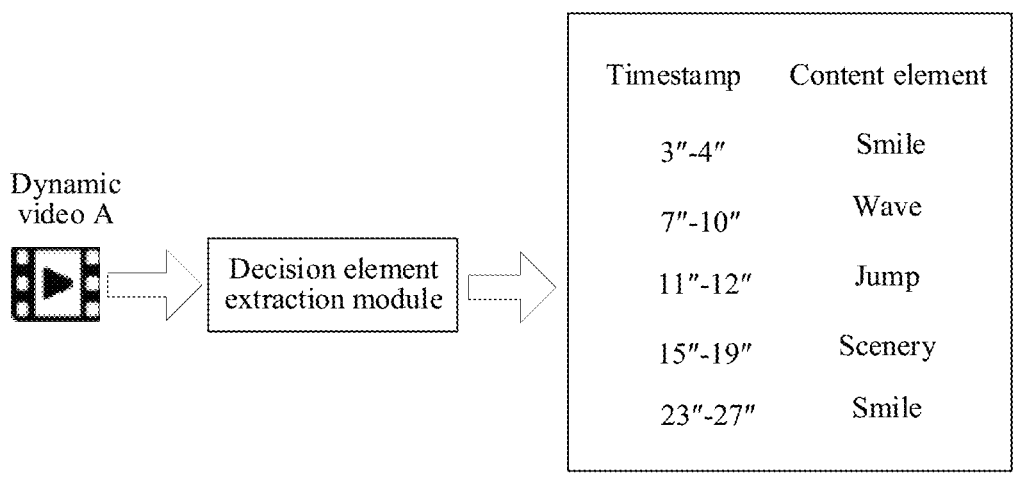
FIG. 3 is an example diagram of determining a content element for a dynamic video according to an embodiment.

For example, an object may include a dynamic video A, and a schematic diagram of a content element obtained for the dynamic video A is shown in FIG. 3. After obtaining the dynamic video A, the decision element extraction module extracts structural information based on a timestamp, so as to determine the content element in the object. Each content element may have a corresponding timestamp. FIG. 3 shows a correspondence between content elements determined from the dynamic video A and the timestamps. FIG. 3 shows 5 types of content elements determined from the dynamic video A, which includes smile, wave, jump, and scenery. The timestamps corresponding to the smile are 3" to 4" and 23" to 27", the timestamp corresponding to the wave is 7" to 10", the timestamp corresponding to the jump is 11" to 12", and the timestamp corresponding to the scenery is 15" to 19".

If the object is a dynamic video, the dynamic video may include a plurality of image frames. Some image frames can represent main content of the object, but some image frames may represent other content besides the main content of the object. For example, when the object is a dynamic video in a TV show, the dynamic video may have content related to the TV show and advertisement images unrelated to the TV show. A video clip that represents the content related to the TV show in the dynamic video may be used as the content element.

To improve the efficiency of determining a content element from an object, a particular image frame may be selected and used as a key frame. The key frame may be a segmentation point used for segmenting the object, so as to obtain a plurality of video clips according to the key frame. The key frame may be used to determine whether each video clip can represent main content of the object, and to determine the content element of the object in the key frame. The key frame may include an image frame of a video, or may include a plurality of consecutive frames of a video.

For example, in the object that includes 100 image frames, the $20^{th}$ frame to the $75^{th}$ frame of the 100 image frames in the object may be advertisement images unrelated to the TV show. Here, the key frame may be the $20^{th}$ image frame and the $75^{th}$ image frame among the 100 image frames, and the object is segmented into a plurality of video clip by using the key frames. For example, the first video clip may be a video clip including the first image frame to the $19^{th}$ image frame, the second video clip is a video clip including the $20^{th}$ image frame to the $75^{th}$ image frame, and the third video clip is a video clip including the $76^{th}$ image frame to the $100^{th}$ video frame. The terminal device recognizes, according to the key frame, that the first video clip and the third video clip may represent the main content of the object, and the second video clip is other content unrelated to the main content of the object. Therefore, the terminal device determines that the first video clip and the third video clip are the content element.

S203. The terminal device determines a material set identifier corresponding to the content type identifier according to a first behavior tree logic.

S204. The terminal device determines a video editing material set corresponding to the content type identifier according to the material set identifier.

The terminal device may determine the material set identifier corresponding to the content type identifier from a video editing material library according to the first behavior tree logic, and determine the video editing material set according to the material set identifier. There may be a plurality of types of video editing materials in the video editing material library, for example, the video editing material may be obtained from a basic material library, and a video editing material included in the basic material library may be material for video editing. The video editing material may also be obtained from a media editing asset, and the media editing asset includes video editing materials, such as a music, a title, a tail leader, a caption, a sticker, a special effect, and a filter. The video editing materials in the media editing asset may be preset. For example, the video editing material may be obtained from the basic material library and the media editing asset. Music in the media editing asset may have different play durations, and may fit with the content element. The title and the tail leader may be a visual title sticker and special effect. The caption content corresponds to the content type identifier corresponding to the content element. The sticker may be a panoramic atmosphere sticker used for matching an atmosphere of a scenario obtained through scenario recognition, or may be a target follow sticker dynamically following items such as a human or an animal. The special effect may be a transition special effect used for connecting different content elements, or may be a visual animation effect implemented based on a shading language of a graphics processing unit (GPU) rendering. The filter may be a filter effect recognized by matching a scenario, for example, a sunset glow filter and a retro movie filter.

The behavior tree logic is a method of using a tree structure to represent that an intellectual body perceives logic execution from an environment, and is used for describing a non-player character (NPC) behavior in a game. In this embodiment, the behavior tree logic is applied to the video editing, to determine a video editing material set consistent with the content feature of the content element.

The behavior tree may include different nodes, for example, a sequence node, a condition node, and an action node. The sequence node may include child nodes, and if all the child nodes are processed, the return is successful. Alternatively, if one or more child nodes fail, the return fails. For example, a main task required to be performed by using the behavior tree is to select a dynamic video with a length being 10", the task may be decomposed into a subtask of selecting 3 dynamic video clips with lengths being 3", 3", and 4", and each subtask may represent a child node of the sequence node.

The condition node may return a success or a failure according to a comparison result of the condition. For example, the condition node represents determining whether a length of a time period corresponding to a content element in a dynamic video is 3". If the length is 3", a dynamic video corresponding to the time period is selected. If the length is not 3", a dynamic video corresponding to the time period with a length being 3" is randomly selected. That is, if a length of a time period of a clip in the dynamic video satisfies a predetermined length set by a user or a program, the condition node returns a success of selecting the dynamic video.

The action node may return a success, a failure, or a running according to an action result. The action node is responsible for implementing a dynamic video editing strategy, for example, selecting and returning a clip in a dynamic video to an interface, which may directly correspond to an application programming interface (API) of an underlying video software development kit (SDK).

It may be understood that, different behavior trees may implement different logics. In this embodiment, a behavior tree logic used in S203 is a first behavior tree logic, and an example diagram of determining a video editing material set corresponding to a content type identifier by using the first behavior tree logic is shown in FIG. 4. The content element in FIG. 4 is the content element obtained in FIG. 3, the content element may be inputted into the first behavior tree shown in FIG. 4, and the first behavior tree logic may determine the video editing material set according to the content type identifier.

Nodes shown in an action 1, an action 2, and an action 3 are used for representing video editing materials determined for the content element. For example, the action 1 is "add a cute pet sticker", and a video editing material of a cute pet sticker, among a plurality of video editing materials in a video editing material set may be obtained. In another example, the child node of the sequence node selects and returns video clips of 3" and 4", a video clip with a timestamp being 3" to 5", a video clip with a timestamp being 23" to 27", and a video clip with a timestamp being 7" to 10", the action 1 is wave, and the action 2 is smile. A child node of a selection node represents whether a length of a video clip is 3". If a length of a video clip with a timestamp being 3" to 5" is 3", the action 2 is smile. If a length of a video clip with a timestamp being 11" to 12" is 2", the action 3 is jump.

A behavior tree logic, such as the first behavior tree logic, may be represented in a domain specific language (DSL), which is easy to store and parse. Specifically, the behavior tree logic is described in an extensible markup language (XML).

In this embodiment, the first behavior tree logic is used for video editing, and a behavior tree, such as a first behavior tree needs to be created previously, and the terminal device needs to be ensured to use the first behavior tree logic. For example, developers are required to develop behavior tree development tools, such as an editor, so as to use the editor to implement creation, modification, subtree editing, and the like of a behavior tree node. Moreover, the developers are required to develop an interpreter, to read a behavior tree represented in an XML, and dynamically compile the behavior tree into a code logic and add the code logic into an editing strategy implementation module.

When the video editing material is obtained from the media editing asset, the media editing asset and the created first behavior tree may be packaged into a resource, and are delivered by using a content management system (CMS) of the backend. Therefore, when the video editing is required to be performed on an object, the video editing material set is determined by using the first behavior tree logic.

S205. Obtain an edited video through synthesis according to the content element and the video editing material set.

In this embodiment, video editing materials in the video editing material set in a timeline may be ranked according to an actual shooting time of the content element, and therefore, the edited video is obtained by synthesizing the content element and the video editing material set in the timeline.

The content element has a corresponding timestamp, for example, the content element in FIG. 3 is "smile", a corresponding timestamp is 3" to 4", and a duration of the content element is 1". However, in some cases, a duration allocated for the content element in the edited video may be different from the duration of the content element. The duration allocated for the content element in the edited video may be greater than the duration of the content element, or may be less than the duration of the content element. Therefore, in an implementation, the terminal device may perform time adjustment on the content element according to a third behavior tree logic, so that a duration of the content element after the adjustment satisfies a duration allocated in the edited video, and the synthesis of the content element and the video editing material set is more reasonable and accurate.

A manner in which the terminal device performs time adjustment on the content element according to the third behavior tree logic depends on a size relationship between the duration allocated for the content element in the edited video and the duration of the content element. If the duration allocated for the content element in the edited video is greater than the duration of the content element, the terminal device may perform time adjustment on the content element by increasing the duration of the content element according to the third behavior tree logic. For example, the duration of the content element is 1", the duration allocated for the content element in the edited video is 2", and the terminal device is required to increase the duration of the content element to 2" according to the third behavior tree logic, so that the duration of the content element after the adjustment satisfies the duration allocated in the edited video. The terminal device may increase the duration of 1" of the content element to 2" by using a mode of 0.5 times speed, or may increase the duration of 1" of the content element to 2" by using a method of repeated play.

If the duration allocated for the content element in the edited video is less than the duration of the content element, the terminal device performs time adjustment on the content element by decreasing the duration of the content element according to the third behavior tree logic. For example, the duration of the content element is 1", the duration allocated for the content element in the edited video is 0.5", and the duration of the content element is required to be decreased to 0.5" according to the third behavior tree logic, so that the duration of the content element after the adjustment satisfies the duration allocated in the edited video. The terminal device may decrease the duration of 1" of the content element to 0.5" by using a mode of 2 times speed.

It may be seen from the foregoing embodiments that, for an object, a content element used for video editing in the object is determined, and each content element has a corresponding content type identifier that identifies a content feature of the content element. After the content element is determined, a material set identifier corresponding to the content type identifier may be determined through a first behavior tree logic, and a video editing material set corresponding to the content type identifier is determined according to the material set identifier. That is, content features represented by the determined video editing material set and the content element are consistent. Therefore, edited videos obtained through synthesis according to the content element and the video editing material set are consistent with the content feature of the content element in an entire style, and edited videos synthesized according to content elements of different content features are different in style. In addition, a behavior tree logic may provide randomness, and therefore, diversity of a video editing material set is further improved, and edited videos synthesized according to content elements of similar content features may differ in style. Compared with the conventional video editing, the obtained edited video is less homogenous, thereby improving user experience in video editing.

In addition, by using the video editing method according to the one or more embodiments, the user only needs to select an original static image and/or dynamic video as an object, and then, the terminal device may perform video editing automatically. Therefore, the user is not required to manually edit one or more images of a video to obtain a content element, thereby saving interaction time for the user and improving accuracy and efficiency of video editing.

It may be understood that, when the terminal device determines a video editing material set according to the content type identifier, if a video editing material set is determined, then, the video editing material set may be directly used during S204. If a plurality of video editing material sets are determined, because generally only one video editing material set is used during S204 and an entire style of the used video editing material set is most consistent with the content feature of the content element, in this case, one video editing material set needs to be selected as the finally determined video editing material set corresponding to the content type identifier.

S204 is described when there are a plurality of material set identifiers. Referring to FIG. 5, S204 includes the following operations.

S501. The terminal device determines, when there are a plurality of material set identifiers, a target material set identifier from among the plurality of material set identifiers.

It may be understood that, the material set identifier corresponding to the content type identifier determined by the terminal device may include one or more material set identifiers. For example, when there are a plurality of content type identifiers, a plurality of material set identifiers corresponding to the plurality of content type identifiers may be determined.

In this embodiment, a target material set identifier may be determined in a plurality of manners. In a possible implementation, to ensure that the finally determined video editing material set corresponding to the content type identifier is most consistent with the content feature of the content element in the entire style, the terminal device may determine the target material set identifier in a manner of calculating a count of each material set identifier in the plurality of material set identifiers, and using the most frequent used material set identifier in the plurality of material set identifiers as the target material set identifier. When the target material set identifier is set according to the most frequent use, a video editing material set corresponding to the target material set identifier may be consistent with the content feature of the content element in the entire style.

For example, a dynamic video may be divided into 10 video clips according to timestamps, and a content type identifier of content elements in 8 video clips is a cute pet, and a content type identifier of content elements in 2 video clips is a scenery. Here, it may be determined that the plurality of material set identifiers determined according to the respective content type identifiers include the cute pet and the scenery. A frequency of the cute pet is 8, and a frequency of the scenery is 2. It may be seen that, a video editing material set with a material set identifier being a cute pet is more consistent with the content feature of the content element, and the cute pet may be used as the target material set identifier.

S502. The terminal device uses a video editing material set corresponding to the target material set identifier as the video editing material set corresponding to the content type identifier.

By using the method provided in this embodiment, the terminal device may logically select, a video editing material set corresponding to the content type identifier from the plurality of video editing material sets, so as to unify video editing material sets required for synthesizing a video, and therefore, a video editing material set used for synthesizing an edited video is most consistent with the content feature of the content element in the entire style.

In some cases, a video editing material set includes a plurality of video editing materials. Some video editing materials match the content type identifier, and some video editing materials does not match the content type identifier. The video editing material matching the content type identifier is more consistent with the content feature of the content element, and an obtained edited video is more coordinated when synthesizing with the content element.

In addition, after performing S204, a video editing material matching the content type identifier may be determined from the video editing material set according to the second behavior tree logic. Therefore, when performing S205, the terminal device may obtain an edited video through synthesis according to the content element and the matching video editing material.

For example, a video editing material set with a material set identifier being a cute pet includes a sticker with a pattern being a dog and a sticker with a pattern being a rabbit. The content type identifier is a dog, and the terminal device may determine a matching video editing material, that is, the sticker with a pattern being a dog, from the video editing material set, so as to obtain an edited video through synthesis according to the content element "dog" and the sticker with a pattern being a dog.

By using the method provided in this embodiment, the video editing material used for synthesizing the edited video is more consistent with the content feature of the content element in the entire style, and an edited video obtained by synthesizing the matching video editing material and the content element is more coordinated.

Subsequently, the video editing method provided in this embodiment is described below with reference to an actual application scenario. In this application scenario, a user performs video editing by using a video editing software on a terminal device, an object is selected by the user from an album of the terminal device, and a video editing material is from a media editing asset.

Figure 6:
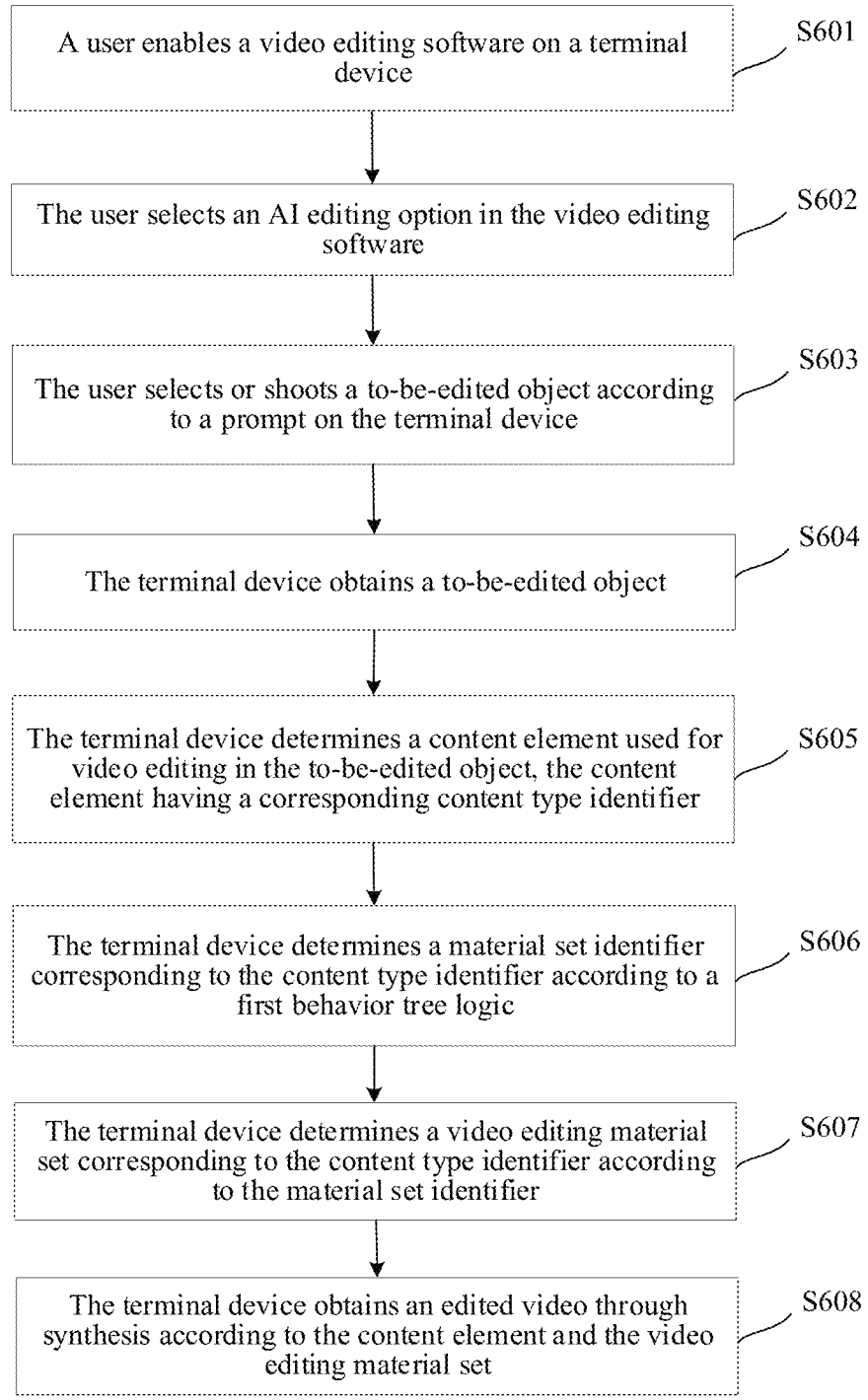
FIG. 6 is a flowchart of a video editing method according to an embodiment.

FIG. 6 is a flowchart of a video editing method according to an embodiment. The video editing method of FIG. 6 will be described with reference to FIGS. 7 and 8. The method includes the following operations.

S601. A user enables a video editing software on a terminal device.

Figure 7:
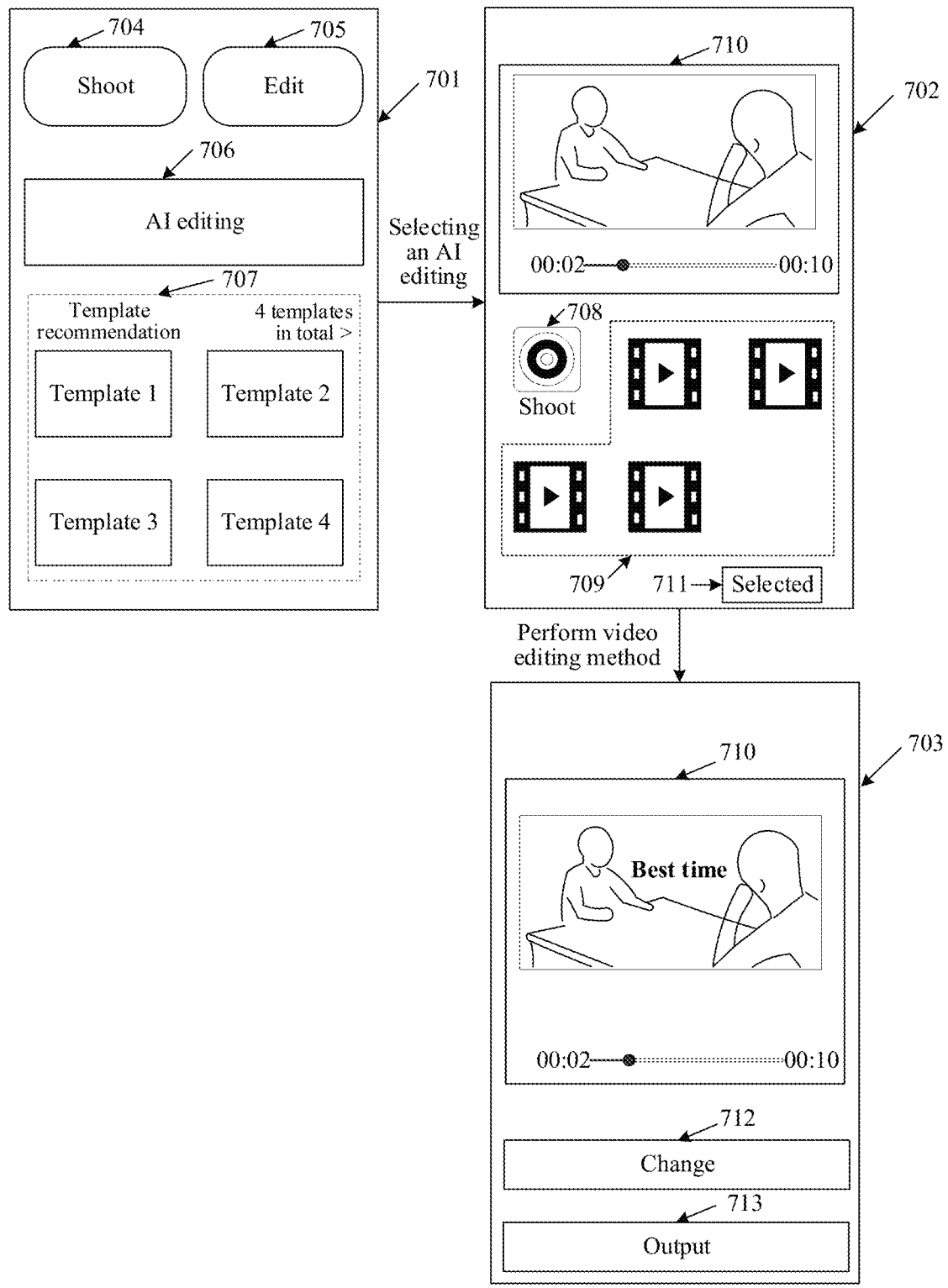
FIG. 7 is an interface diagram of a video editing software home page according to an embodiment.

An interface 701 of a home page of the video editing software is shown in FIG. 7. The interface 701 includes a shooting option 704, an editing option 705, an AI editing option 706, and a template recommendation region 707. The template recommendation region 707 schematically shows four templates currently available: a template 1, a template 2, a template 3, and a template 4. However, the number of templates are not limited thereto, and may include any number of templates.

S602. The user selects an AI editing option in the video editing software.

After selecting the AI editing option, the user may enter a video editing interface, and the video editing interface is shown as 702 in FIG. 7. The video editing interface 702 includes a shooting button 708, a selection region 709 of one or more objects, a video playback region 710, and a confirmation option 711 (e.g., "selected"). At least one object played by the shooting button 708 and the selection region 709 is used for prompting the user to shoot or select an object.

S603. The user selects or shoots an object according to a prompt on the terminal device.

Figure 8:
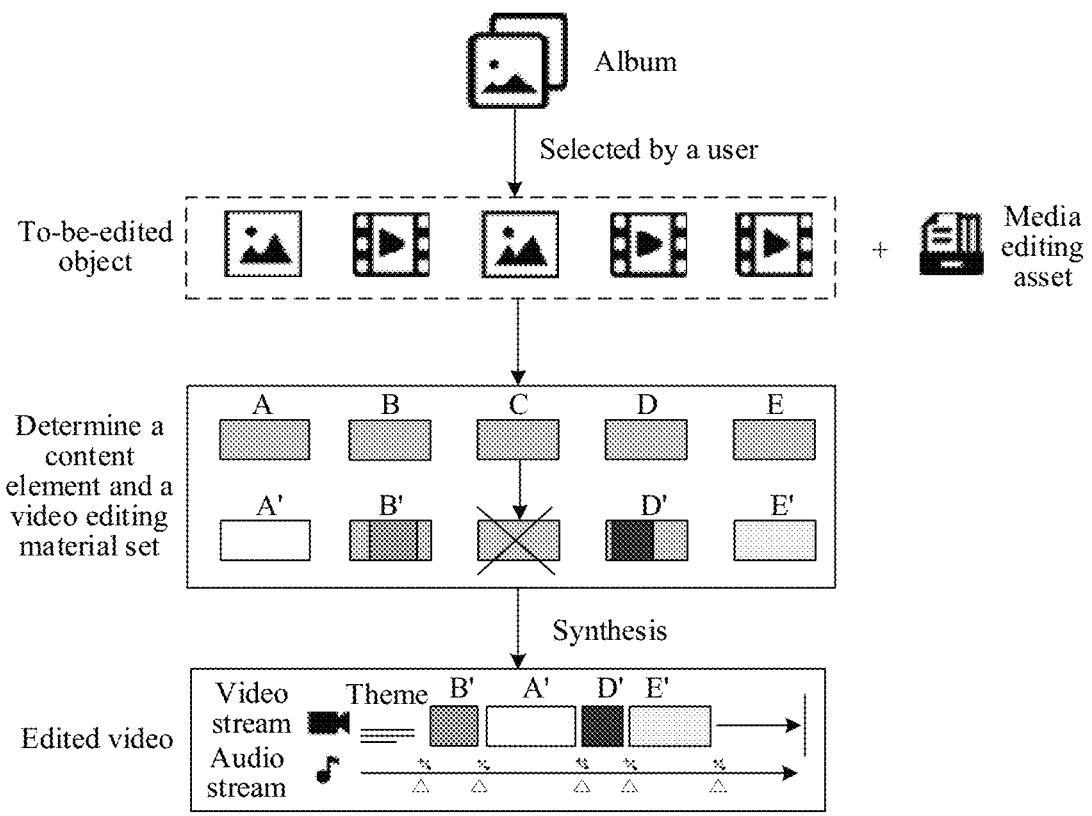
FIG. 8 is an example diagram of a video editing method according to an embodiment.

Referring to FIG. 8, an example in which a user selects an object from the album is used for describing implementing video editing according to the object in FIG. 8. The object selected by the user includes two static images and three dynamic videos.

S604. A terminal device obtains an object.

The implementation may refer to the foregoing step S201, which is not repeated herein.

S605. The terminal device determines a content element used for video editing in the object, the content element having a corresponding content type identifier.

Referring to FIG. 8, the terminal device determines that the content elements used for video editing in the object are respectively a static image A, a dynamic video clip B, a static image C, a dynamic video clip D, and a dynamic video clip E. A dynamic video clip B', a dynamic video clip D', and a dynamic video clip E' may be extracted according to the foregoing three dynamic videos. A determining manner of the content element may refer to the foregoing step S202, which is not repeated herein.

S606. The terminal device determines a material set identifier corresponding to the content type identifier according to a first behavior tree logic.

The implementation may refer to step S203, which is not repeated herein.

S607. The terminal device determines a video editing material set corresponding to the content type identifier according to the material set identifier.

Referring to FIG. 8, the terminal device determines a video editing material set corresponding to the content type identifier from the media editing asset. The terminal device obtains, by editing the content elements, content elements used for synthesizing with the video editing set, which are respectively a static image A', a dynamic video clip B', a dynamic video clip D', and a dynamic video clip E'. The static image A' is the static image A, the dynamic video clip B' is a part of clip of the dynamic video clip B, the dynamic video clip D' is a part of clip of the dynamic video clip D, and the dynamic video clip E' is the dynamic video clip E. The implementation may refer to step S204, which is not repeated herein.

S608. The terminal device obtains an edited video through synthesis according to the content element and the video editing material set.

The obtained edited video is shown in FIG. 8, and the edited video includes a video stream and an audio stream. The video stream is obtained by the dynamic video clip B', the static image A', the dynamic video clip D', and the dynamic video clip E' with reference to a theme in the media editing asset. The audio stream is an audio material in the media editing asset.

After obtaining the edited video, the terminal device may display the obtained edited video to the user, and a display interface is shown as 703 in FIG. 7. The display interface 703 includes a video playback region 710, a reproduction option 712, and an output option 713. If the user is satisfied with the edited video, the output option 713, that is, an "output" button, may be clicked, and the edited video is outputted. If the user is not satisfied with the edited video, a reproduction option 712, that is, a "change" button, in the 703 may be clicked, and the edited video is reproduced.

Figure 9:
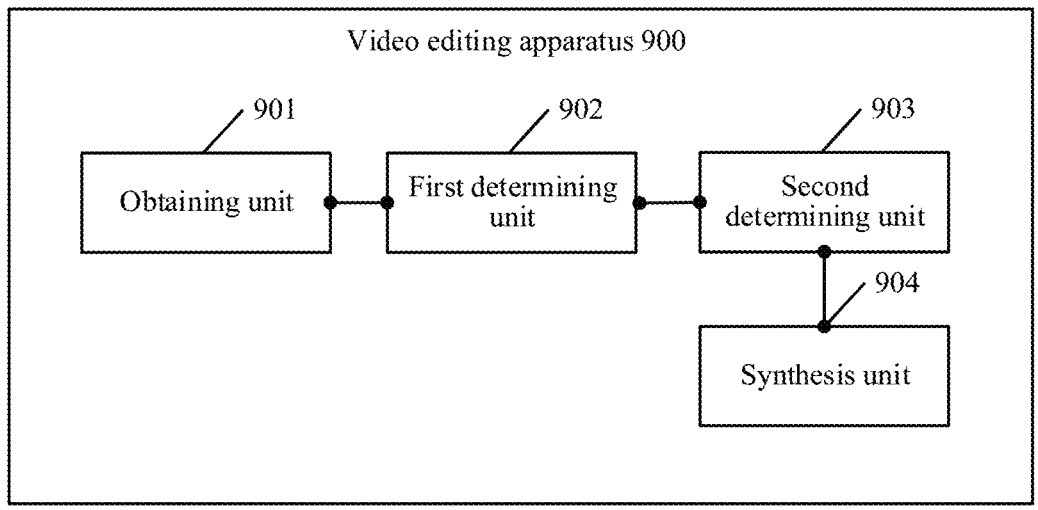
FIG. 9 is a structural diagram of a video editing apparatus according to an embodiment.

FIG. 9 is a video editing apparatus according to an embodiment. Referring to FIG. 9, the apparatus includes an obtaining unit 901, a first determining unit 902, a second determining unit 903, and a synthesis unit 904. The obtaining unit 901 is configured to obtain an object; the first determining unit 902 is configured to determine a content element used for video editing in the object, the content element having a corresponding content type identifier; the second determining unit 903 is configured to determine a material set identifier corresponding to the content type identifier according to a first behavior tree logic; the second determining unit 903 is further configured to determine a video editing material set corresponding to the content type identifier according to the material set identifier; and the synthesis unit 904 is configured to obtain an edited video through synthesis according to the content element and the video editing material set.

In an embodiment, the second determining unit 903 is further configured to: determine, when there are a plurality of material set identifiers, a target material set identifier from the plurality of material set identifiers; and use a video editing material set corresponding to the target material set identifier as the video editing material set corresponding to the content type identifier.

Figure 10:
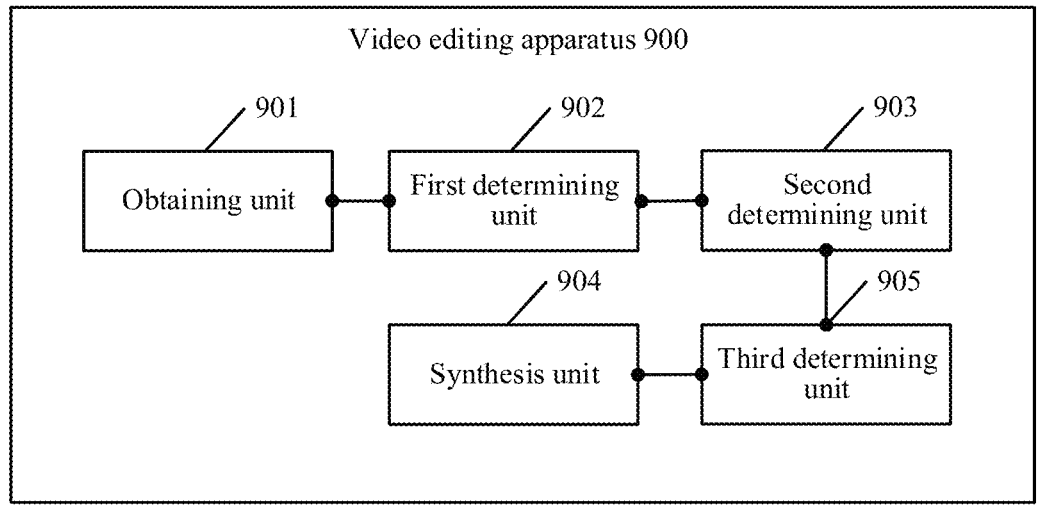
FIG. 10 is a structural diagram of a video editing apparatus according to another embodiment.

In an embodiment, referring to FIG. 10, the apparatus further includes a third determining unit 905 configured to determine a video editing material matching the content type identifier from the video editing material set according to a second behavior tree logic; and the synthesis unit configured to obtain the edited video through synthesis according to the content element and the matching video editing material.

Figure 11:
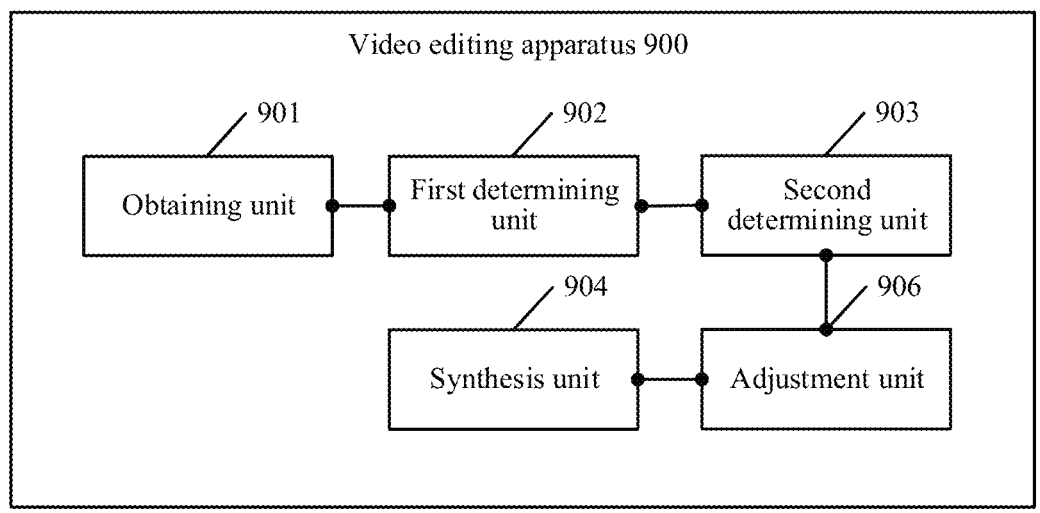
FIG. 11 is a structural diagram of a video editing apparatus according to another embodiment.

In an embodiment, referring to FIG. 11, the apparatus further includes an adjustment unit 906 configured to perform time adjustment on the content element according to a third behavior tree logic, so that a duration of the content element after the adjustment satisfies a duration allocated in the edited video.

The first determining unit 902 may be further configured to determine the content element in the object and the content type identifier corresponding to the content element by extracting structural information of the object.

When the object is a dynamic video, the first determining unit 902 is configured to determine, according to a key frame of the object, the content element used for video editing from the object.

It may be seen from the foregoing embodiments that, for an object, a content element used for video editing in the object is determined, and each content element has a corresponding content type identifier, and may identify a content feature of the corresponding content element. After the content element is determined, a material set identifier corresponding to the content type identifier may be determined through a first behavior tree logic, and a video editing material set corresponding to the content type identifier is determined according to the material set identifier, that is, content features represented by the determined video editing material set and the content element are consistent. Therefore, edited videos obtained through synthesis according to the content element and the video editing material set are consistent with the content feature of the content element in an entire style, and edited videos synthesized according to content elements of different content features are different in an entire style. In addition, a behavior tree logic has randomness, and therefore, diversity of a video editing material set is further improved, and edited videos synthesized according to content elements of similar content features may differ in entire styles. Compared with the conventional video editing, the obtained edited video is less homogenous, thereby improving users experience.

Figure 12:
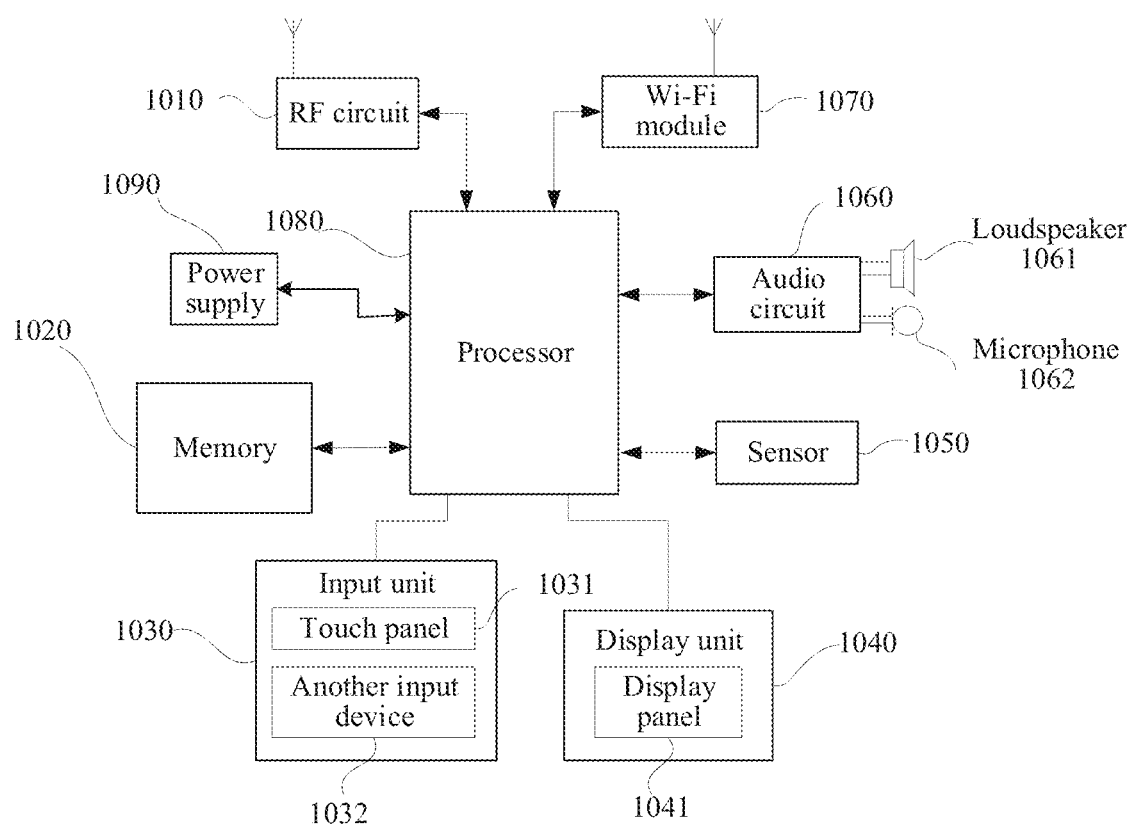
FIG. 12 is a structural diagram of a device used for video editing according to an embodiment.

The one or more embodiments further provide a device used for video editing, and the following describes the device used for video editing with reference to the accompanying drawings. Referring to FIG. 12, a video editing device 1000 may be a terminal device. The terminal device may be a mobile phone, a tablet computer, a personal digital assistant (PDA), a point of sales (POS), or an on-board computer, and the terminal device being a mobile phone is used as an example herein.

FIG. 12 shows a block diagram of the structure of a part of a mobile phone related to a terminal device according to an embodiment. Referring to FIG. 12, the mobile phone includes components such as: a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art may understand that the structure of the mobile phone shown in FIG. 12 does not constitute a limitation on the terminal device, and the terminal device may include more or fewer components than those shown in FIG. 12, or some components may be combined or a different component deployment may be used.

The RF circuit 1010 may be configured to receive and transmit a signal in an information receiving and transmission process or a call process, and in particular, after receiving downlink information of a base station, transmit the downlink information to the processor 1080 for processing. In addition, the RF circuit transmits uplink data to the base station. The RF circuit 1010 includes, but is not limited to, an antenna, at least one amplifier, a transceiver, a coupler, a low noise amplifier (LNA), a duplexer, and the like. In addition, the RF circuit 1010 may also communicate with a network and another device through wireless communication. The wireless communication may use any communication standard or protocol, including, but not limited to a global system for mobile communication (GSM), a general packet radio service (GPRS), code division multiple access (CDMA), wideband code division multiple access (WCDMA), long term evolution (LTE), an email, a short messaging service (SMS), and the like.

The memory 1020 may be configured to store a software program and/or module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 1020 may include a high speed random access memory, and may further include a non-volatile memory, such as at least one magnetic disk storage device, a flash memory device, or other non-volatile solid state storage devices.

The input unit 1030 may be configured to receive input from a user, and generate a input signal related to the user setting and function control of the mobile phone. Specifically, the input unit 1030 may include a touch panel 1031 and another input device 1032. The touch panel 1031, which may also be referred to as a touchscreen, may collect a touch operation of a user on or near the touch panel (such as an operation of a user on or near the touch panel 1031 by using any suitable object or accessory such as a finger or a stylus), and drive a corresponding connection apparatus according to a preset program. In addition, the touch panel 1031 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 1080, and receives and executes a command transmitted by the processor 1080. In addition, the touch panel 1031 may be a resistive, capacitive, infrared, or surface sound wave type touch panel. In addition to the touch panel 1031, the input unit 1030 may further include the another input device 1032. Specifically, the another input device 1032 may include, but is not limited to, one or more of a physical keyboard, a functional key (for example, a volume control key or a switch key), a track ball, a mouse, and a joystick.

The display unit 1040 may be configured to display information inputted by the user or information provided for the user, and various menus of the mobile phone. The display unit 1040 may include a display panel 1041. In addition, the display panel 1041 may be configured in the form of a liquid crystal display (LCD), an organic light-emitting diode (OLED), or the like. Further, the touch panel 1031 may cover the display panel 1041. After detecting a touch operation on or near the touch panel, the touch panel 1031 transfers the touch operation to the processor 1080, to determine a type of a touch event. Then, the processor 1080 provides a corresponding visual output on the display panel 1041 according to the type of the touch event. Although in FIG. 12, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor can detect magnitude of accelerations in various directions (generally on three axes), may detect magnitude and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1060, a loudspeaker 1061, and a microphone 1062 may provide audio interfaces between the user and the mobile phone. The audio circuit 1060 may convert received audio data into an electrical signal and transmit the electrical signal to the loudspeaker 1061. The loudspeaker 1061 converts the electrical signal into a sound signal and outputs the sound signal. In addition, the microphone 1062 converts a collected sound signal into an electrical signal. After receiving the electrical signal, the audio circuit 1060 converts the electrical signal into audio data, and then outputs the audio data. After being processed by the processor 1080, the audio data is transmitted through the RF circuit 1010 to, for example, another mobile phone or the audio data is outputted to the memory 1020 for further processing.

Wi-Fi belongs to a short distance wireless transmission technology. The mobile phone may help, by using the Wi-Fi module 1070, a user to receive and send an email, browse a web page, access stream media, and the like. This provides wireless broadband Internet access for the user. Although FIG. 12 shows the Wi-Fi module 1070, it may be understood that the Wi-Fi module 1070 is not a necessary component of the mobile phone, and the Wi-Fi module 1070 may be omitted as required provided that the scope of the essence of the present disclosure is not changed.

The processor 1080 may be configured to control overall operations of a terminal device. For example, the processor 1080 may be a control center of the mobile phone, and is connected to various parts of the mobile phone through various interfaces and lines. By running or executing a software program and/or module stored in the memory 1020, and invoking data stored in the memory 1020, the processor 1080 executes various functions of the mobile phone and performs data processing, thereby monitoring the mobile phone. In addition, the processor 1080 may include one or more processing units. Further, the processor 1080 may integrate an application processor and a modem processor, where the application processor mainly processes an operating system, a user interface, an application program, and the like, and the modem processor mainly processes wireless communication. It may be understood that the foregoing modem processor may either not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment, the processor 1080 included in the terminal device may be configured to perform the following operations: obtaining an object; determining a content element used for video editing in the object, the content element having a corresponding content type identifier; determining a material set identifier corresponding to the content type identifier according to a first behavior tree logic; determining a video editing material set corresponding to the content type identifier according to the material set identifier; and obtaining an edited video through synthesis according to the content element and the video editing material set.

The processor is further configured to perform the following operations: determining, when there are a plurality of material set identifiers, a target material set identifier from the plurality of material set identifiers; and using a video editing material set corresponding to the target material set identifier as the video editing material set corresponding to the content type identifier.

The processor is further configured to perform the following operations: determining a video editing material matching the content type identifier from the video editing material set according to a second behavior tree logic; and obtaining the edited video through synthesis according to the content element and the matching video editing material.

The processor is further configured to perform the following operations: performing time adjustment on the content element according to a third behavior tree logic, so that a duration of the content element after the adjustment satisfies a duration allocated in the edited video.

The processor is further configured to perform the following operations: determining the content element in the to-be-edited object and the content type identifier corresponding to the content element by extracting structural information of the object.

If the object is a dynamic video, the processor is further configured to perform the following operations: determining, according to a key frame of the object, the content element used for video editing from the object.

Figure 13:
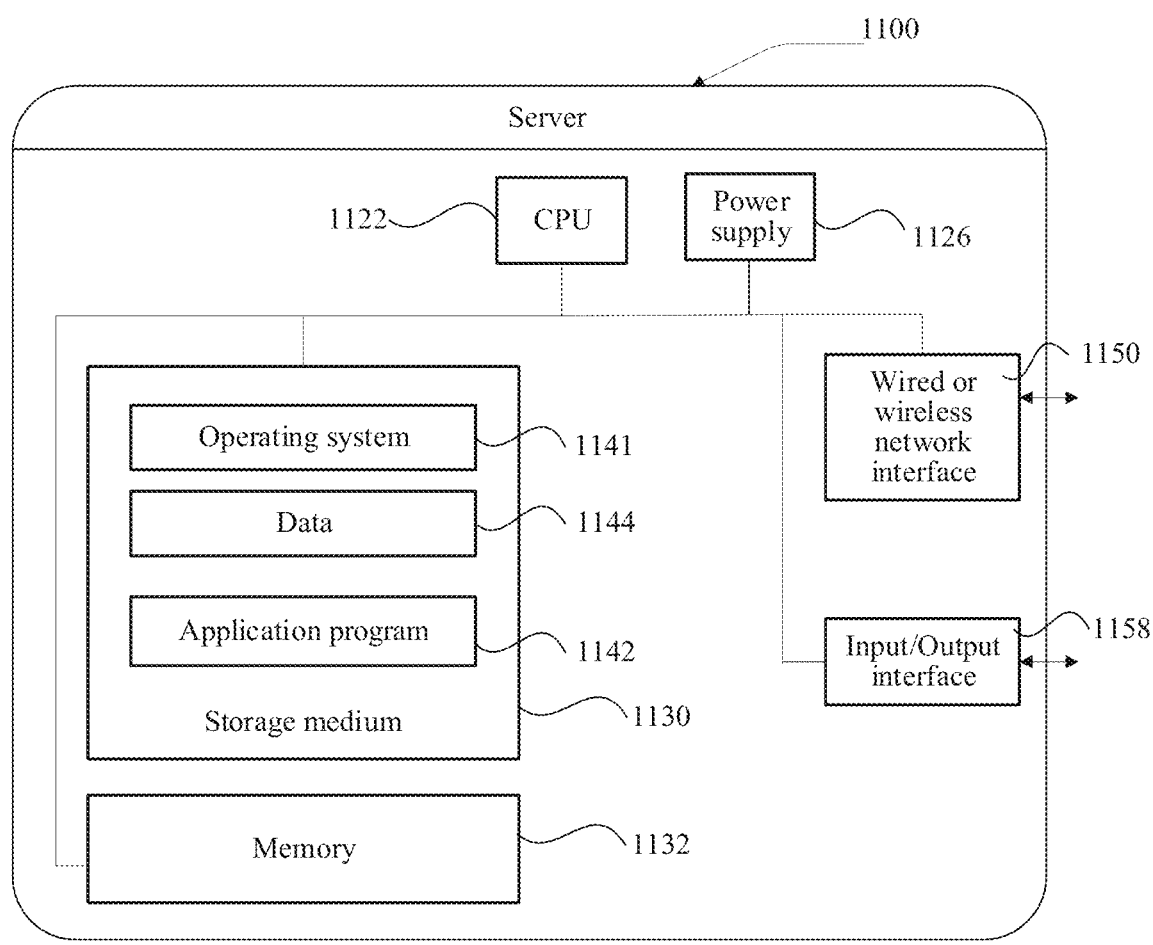
FIG. 13 is a structural diagram of a server according to an embodiment.

The device used for video editing provided in this embodiment of this application may be a server. FIG. 13 is a schematic structural diagram of a server 1100 according to an embodiment. The server 1100 may vary greatly due to different configurations or performance, and may include one or more central processing units (CPU) 1122 (for example, one or more processors) and a memory 1132, and one or more storage mediums 1130 (for example, one or more mass storage devices) that store an application program 1142 or data 1144. The memory 1132 and the storage medium 1130 may be transient or persistent storage. The program stored in the storage medium 1130 may include one or more modules, and each module may include a series of instructions and operations for the server. Further, the CPU 1122 may be set to communicate with the storage medium 1130, and perform, on the server 1100, the series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps performed by the server in the foregoing embodiments may be based on the server structure shown in FIG. 13.

The CPU 1022 is configured to perform the following operations: obtaining an object; determining a content element used for video editing in the object, the content element having a corresponding content type identifier; determining a material set identifier corresponding to the content type identifier according to a first behavior tree logic; determining a video editing material set corresponding to the content type identifier according to the material set identifier; and obtaining an edited video through synthesis according to the content element and the video editing material set.

The processor is further configured to perform the following operations: determining, when there are a plurality of material set identifiers, a target material set identifier from the plurality of material set identifiers; and using a video editing material set corresponding to the target material set identifier as the video editing material set corresponding to the content type identifier.

The processor is further configured to perform the following operations: determining a video editing material matching the content type identifier from the video editing material set according to a second behavior tree logic; and obtaining the edited video through synthesis according to the content element and the matching video editing material.

The processor is further configured to perform the following operations: performing time adjustment on the content element according to a third behavior tree logic, so that a duration of the content element after the adjustment satisfies a duration allocated in the edited video.

The processor is further configured to perform the following operations: determining the content element in the object and the content type identifier corresponding to the content element by extracting structural information of the object.

If the object is a dynamic video, the processor is further configured to perform the following operations: determining, according to a key frame of the to-be-edited object, the content element used for video editing from the to-be-edited object.

In an embodiment, a computer-readable storage medium such as a memory including instructions, applicable to a terminal or a server, is further provided, and the instructions may be executed by a processor to complete the video editing method in the foregoing embodiments. For example, the computer-readable storage medium may be a read-only memory (ROM), a random access memory (random-access memory, RAM), a compact disc read-only memory (CD-ROM), a magnetic tape, a floppy disk, an optical data storage device, and the like.

The terms "first", "second", "third", "fourth", and the like (if any) in the specification of this application and the foregoing accompanying drawings are used for distinguishing similar objects, and are not necessarily used for describing a particular sequence or order. Data used in this way is interchangeable in a suitable case, so that the embodiments of this application described herein can be implemented in a sequence in addition to the sequence shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It is to be understood that, "at least one (item)" refers to one or more and "a plurality of" refers to two or more. "And/or" is used to describe an association between associated objects. For example, "A and/or B" may indicate that only A, only B, and both A and B, where A and B may be singular or plural. The character "I" generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

In the one or more embodiments, it is to be understood that the disclosed system, apparatus, device and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments may be integrated into one processing unit, or each of the units may be physically separated, or two or more units may be integrated into one unit. The integrated unit may be implemented in the form of hardware, or may be implemented in a form of a software functional unit.

The term used in the one or more embodiments of the disclosure such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

The term "unit" or "module" may be implemented using hardware components such as microprocessor and/or memory.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes various media capable of storing program codes, such as, a USB flash drive, a mobile hard disk, a Read Only Memory (ROM), a Random Access Memory (RAM), a magnetic disk, or an optical disc.

The foregoing embodiments are merely intended for describing the technical solutions of this application, but not for limiting this application. Although the one or more embodiments of the disclosure is described in detail with reference to the accompanying drawings, a person of ordinary skill in the art is to understand that they may still make modifications to the technical solutions described in the foregoing embodiments or make equivalent replacements to some technical features thereof, without departing from the spirit and scope of the technical solutions of the embodiments of the disclosure.

The invention claimed is:

1. A video editing method, performed by a terminal device, the method comprising:
   obtaining an object, the object including one or more images;
   determining a content element of the object for video editing, the content element having a content type identifier, by extracting structural information of the object;
   determining a material set identifier corresponding to the content type identifier according to a first behavior tree logic;
   determining a video editing material set corresponding to the material set identifier; and
   obtaining an edited video according to the content element and the video editing material set.

2. The method according to claim 1, wherein the determining the video editing material set corresponding to the material set identifier comprises:
   determining, when there are a plurality of material set identifiers, a target material set identifier from among a plurality of material set identifiers; and
   using a video editing material set corresponding to the target material set identifier as the video editing material set corresponding to the content type identifier.

3. The method according to claim 1, wherein the method further comprises:
   determining a video editing material matching the content type identifier from the video editing material set according to a second behavior tree logic; and
   the obtaining the edited video according to the content element and the video editing material set comprises:
   obtaining the edited video through synthesis according to the content element and the video editing material.

4. The method according to claim 1, wherein the method further comprises:
   performing a time adjustment on the content element according to a third behavior tree logic, so that a duration of the content element after the adjustment satisfies a duration allocated for the content element in the edited video.

5. The method according to claim 1, wherein the determining the content element used for the video editing further comprises, based on the object being a dynamic video, determining, according to a key frame of the object, the content element of the object for the video editing.

6. The method according to claim 1, wherein the extracting the structural information of the object comprises:
   using an artificial intelligence (AI) for converting non-structural data of the object into structural data of the object.

7. The method according to claim 1, wherein the first behavior tree logic comprises:
   at least one sequence node for selecting a dynamic video, the at least one sequence node comprises at least one child node for processing a portion of the dynamic video based on a length of the portion of the dynamic video;
   at least one condition node for determining whether a length of a time period corresponding to the portion of the dynamic video satisfies a predetermined length; and
   at least one action node for returning the portion of the dynamic video that satisfies the predetermined length to an application programming interface (API).

8. A video editing apparatus, the apparatus comprising:
   at least one memory configured to store computer program code; and
   at least one processor configured to access the at least one memory and operate as instructed by the computer program code, the computer program code comprising:
   obtaining code configured to cause at least one processor to obtain an object, the object including one or more images;
   first determining code configured to cause at least one processor to determine a content element of the object for video editing, the content element having a content type identifier, by extracting structural information of the object;
   second determining code configured to cause at least one processor to:
      determine a material set identifier corresponding to the content type identifier according to a first behavior tree logic, and
      determine a video editing material set corresponding to the material set identifier; and
   synthesis code configured to cause at least one processor to obtain an edited video according to the content element and the video editing material set.

9. The apparatus according to claim 8, wherein the second determining code is further configured to cause at least one processor to:
 determine, when there are a plurality of material set identifiers, a target material set identifier from among a plurality of material set identifiers; and
 use a video editing material set corresponding to the target material set identifier as the video editing material set corresponding to the content type identifier.

10. The apparatus according to claim 8, wherein the apparatus further comprises third determining code configured to cause at least one processor to: determine a video editing material matching the content type identifier from the video editing material set according to a second behavior tree logic, and
 wherein the synthesis code is further configured to cause at least one processor to obtain the edited video through synthesis according to the content element and the video editing material.

11. The apparatus according to claim 8, wherein the apparatus further comprises:
 adjustment code configured to cause at least one processor to perform a time adjustment on the content element according to a third behavior tree logic, so that a duration of the content element after the adjustment satisfies a duration allocated for the content element in the edited video.

12. The apparatus according to claim 8, wherein the first determining code is further configured to cause at least one processor to, based on the object being a dynamic video, determine, according to a key frame of the object, the content element of the object for the video editing.

13. A non-transitory computer readable recording medium storing computer program code, the computer program code, when executed by at least one processor, configured to:
 obtain an object, the object including one or more images;
 determine a content element of the object for video editing, the content element having a content type identifier, by extracting structural information of the object;
 determine a material set identifier corresponding to the content type identifier according to a first behavior tree logic;
 determine a video editing material set corresponding to the material set identifier; and
 obtain an edited video according to the content element and the video editing material set.

14. The non-transitory computer readable recording medium according to claim 13, wherein the at least one processor is further configured to:
 determine, when there are a plurality of material set identifiers, a target material set identifier from among a plurality of material set identifiers; and
 use a video editing material set corresponding to the target material set identifier as the video editing material set corresponding to the content type identifier.

15. The non-transitory computer readable recording medium according to claim 13, wherein the at least one processor is further configured to:
 determine a video editing material matching the content type identifier from the video editing material set according to a second behavior tree logic; and
 obtain the edited video through synthesis according to the content element and the video editing material.

16. The non-transitory computer readable recording medium according to claim 13, wherein the at least one processor is further configured to:
 perform a time adjustment on the content element according to a third behavior tree logic, so that a duration of the content element after the adjustment satisfies a duration allocated for the content element in the edited video.

17. The non-transitory computer readable recording medium according to claim 13, wherein the processor is further configured to:
 based on the object being a dynamic video, determine, according to a key frame of the object, the content element of the object for the video editing.

\* \* \* \* \*